United States Patent
Esposito (10) Patent No.: US 9,803,681 B2
(45) Date of Patent: Oct. 31, 2017

(54) CUP HOLDER

(71) Applicant: Karen Esposito, Orangeburg, NY (US)

(72) Inventor: Karen Esposito, Orangeburg, NY (US)

( * ) Notice: Subject to any disclaimer, the term of this patent is extended or adjusted under 35 U.S.C. 154(b) by 0 days.

(21) Appl. No.: 15/076,718

(22) Filed: Mar. 22, 2016

(65) Prior Publication Data

US 2016/0278557 A1    Sep. 29, 2016

Related U.S. Application Data

(60) Provisional application No. 62/177,810, filed on Mar. 24, 2015.

(51) Int. Cl.
*A47G 23/02*    (2006.01)
*F16B 47/00*    (2006.01)
*F16B 1/00*    (2006.01)

(52) U.S. Cl.
CPC .......... *F16B 47/00* (2013.01); *A47G 23/0225* (2013.01); *A47G 2023/0283* (2013.01); *F16B 2001/0035* (2013.01)

(58) Field of Classification Search
CPC ........ A47G 23/0225; A47G 2023/0283; A47G 2023/0275
USPC ......................................... 220/603, 737, 738
See application file for complete search history.

(56) References Cited

U.S. PATENT DOCUMENTS

| | | | |
|---|---|---|---|
| 2,589,967 A | 3/1952 | Sawyer | |
| 3,756,252 A * | 9/1973 | Vigorito | A24F 13/22 131/256 |
| 4,726,553 A | 2/1988 | Wischusen | |
| 4,781,643 A * | 11/1988 | Holloway | A63H 33/00 428/18 |
| D303,467 S | 9/1989 | Pepitone | |
| 5,984,136 A | 11/1999 | Mason | |
| 7,198,171 B2 * | 4/2007 | Liu | A47G 19/22 220/737 |
| 8,087,528 B1 | 1/2012 | Scarlett et al. | |
| 8,262,039 B2 | 9/2012 | Royka | |
| D669,741 S | 10/2012 | Shaw | |
| 8,672,176 B2 | 3/2014 | Sayasithsena | |
| 8,733,580 B1 | 5/2014 | Schall, Jr. | |
| 2006/0113200 A1 | 6/2006 | Abkarian et al. | |
| 2007/0205205 A1 | 9/2007 | Kliewer | |

OTHER PUBLICATIONS http://www.amazon.co.uk/Drink-Spill-Catcher-Holder-Coaster/dp/B0043R82ZG.

* cited by examiner

*Primary Examiner* — Stephen Castellano
(74) *Attorney, Agent, or Firm* — Michael E. Zall (57) ABSTRACT

A portable beverage container holder having a tubular upper member having inner and outer walls concentric to each other. The tubular member has a top and bottom portion, the bottom portion having a diameter greater than the top portion forming a tapered tubular member. The top portion diameter is of sufficient size to receive a beverage container and preferably includes an insulated separate liner. The holder has a lower base having a top and bottom surface, preferably with a weight inside and surrounding sidewall. The bottom portion of the tubular member is mounted to the top surface of the base. The sidewall protrudes above the top surface of the base to form a circumferential channel surrounding the lower base to capture any spillage from the container. The bottom surface of the base element has mounted thereto a means for preventing the holder from sliding on a surface.

1 Claim, 8 Drawing Sheets

CUP HOLDER

RELATED APPLICATIONS

This application claims the benefit of U.S. Provisional Application 62/177,810 filed on Mar. 24, 2015 entitled Desktop Cup Stand Device, the entire disclosure of which is incorporated herein by reference.

FIELD OF THE INVENTION

The present invention relates to the field of beverage container receptacles. More particularly it relates a portable cup holder that is designed to hold upright and prevent a beverage container, e.g., paper or Styrofoam cup, a glass, a can or a bottle, from falling over and spilling. More specifically, the preferred holding device or "cup holder" includes a stabilized beverage container receptacle, a thermal insulating material that lines the interior, to help maintain the temperature of the beverage and at least one and preferably two open notches on the sides to allow a fingers to easily grip the container, a bottom surface adapted to resist movement on surfaces and a circumferential channel surrounding the lower base to capture any spillage from the beverage container as well as to eliminate the need for a separate coaster to contain condensation

BACKGROUND OF THE INVENTION

A number of products exist for preventing beverage containers from tipping over and spilling. The beverage container receptacles which are built into exercise equipment, a child stroller, the console of an automobile, or an arm rest of a chair, are well known in the art. However, they generally are not removable or portable and cannot be relocated to the office or kitchen environment for use on desks, tables or counters.

Additionally, known beverage containers that can be used on a desk or flat surface are not generally weighted and may too easily be toppled over. They are primarily designed to hold a mug or cup with a handle, and are unattractive. The invention described and claimed herein has consumer appeal and is crafted to function efficiently to resolve some of the problems associated with the known holders.

The following are references that may be relevant to the claimed invention herein:

U.S. Pat. No. 2,589,967 to Sawyer discloses a child's drinking cup comprising a cup member, the lower part of which has a taper capable of undergoing a slight radial compression, and a base member for receiving and radially compressing the tapered part of the cup member. The base member is a combination drip receiver and stabilizing element.

U.S. Pat. No. 4,726,553 to Wischusen discloses a drinking cup base wherein the cup is placed within a recess in the base, such that the mouth of the base contacts and forms a friction fit with the outside surface of the cup. The base includes a spill tray to retain spillage from the cup.

U.S. Pat. No. 5,984,136 to Mason discloses a device for placement on an office desk or in the home that helps prevent beverages from being spilled. The device has a beverage container receptacle that is wide enough to accept various sized beverage containers and is notched to accept mug handles or allow for the insertion and withdrawal of cups or cans. The receptacle is attached to a stabilizing portion that is wide and flat and thin enough to be slipped under a computer, typewriter, blotter or other piece of office equipment to aid in stabilization.

U.S. Pat. No. 8,087,528 to Scarlett discloses a beverage container holder sized to secure a beverage container that can vary in diameter with frictional fin appendages that secure the container in the cup holder. The holder is surrounded by a stabilizer to enhance stability and protect from liquid spills. The bottom is also textured to provide a sticky surface that does not readily slip over flat surfaces.

U.S. Pat. No. 8,262,039 to Royka discloses, inter alia, a cup holder that has an upright cylinder and has a base that can be fastened to a surface by Velcro, magnet, adhesive or the like.

U.S. Pat. No. 8,672,176 to Sayasithsena discloses a beverage holder that includes a base, a frame, and a plurality of biasing members. The base includes at least one inner region and at least one outer region for collecting moisture. The frame is configured to be supported by the base and to receive drinking vessels of varying sizes and configurations. The plurality of biasing members are detachably coupled to the frame and form with the frame an inner cavity of varying capacity for supporting a drinking vessel. The capacity of the inner cavity is adaptively configured when a portion of the drinking vessel is received in the inner cavity.

U.S. Pat. No. 8,733,580 to Schall discloses a holder for a container for liquid coatings, e.g., pint or tar, having a base and a wall extending up and in from the base. The base rings the bottom of the wall such that a cavity is formed into which the container is placed. The base can include a trough.

US 2006/0113200 A1 to Abkarian discloses a coaster CD/DVD that is curved in the middle and has a place for the cup on top of the coaster.

US 2007/0205205 to Kliewer discloses a low center of gravity beverage container receptacle that has a bottom surface with both a high friction surface and a fabric hooking material to resist skidding on a smooth surface and to resist skidding on fabric. A surrounding annular support is weighted by a gel material or contained weighted granular elements. The container, composed of insulating material, has a notch to accommodate cup handles and an interior step which allows all sizes of drink containers.

US D669,741 to Shaw discloses a beverage container holder.

US D303,467 to Pepitone discloses a tray for holding a paint can and paint tools.

The following non-patent reference was located on the Internet:

http://www.amazon.co.uk/Drink-Spill-Catcher-Holder-Coaster/dp/B0043R82ZG shows a mug holder with a spill catcher.

OBJECTS AND SUMMARY OF THE INVENTION

It is an object of the present invention to provide a low center of gravity portable beverage container holder to accommodate cups, glasses, bottles and cans, that is highly-stable on flat surfaces, resists sliding on smooth surfaces, and is a non-spill portable beverage container holder or receptacle.

Another object of the present invention is to provide small open notches in the sides of the beverage container holder to allow the user's fingers to grip the container easily.

An additional object of the present invention is to provide a beverage container holder with a thermal insulating material to line the inner wall to assist in maintaining the temperature of the beverage.

Additional objects, advantages and other novel features of the invention will be set forth in the description that follows and will become apparent to those skilled in the art.

Broadly, this invention is directed to a portable beverage container holder. The holder comprises:
- a. a tubular upper member having an inner wall and an outer wall that are concentric to each other, the tubular member having a top portion and a bottom portion, the bottom portion having a diameter greater than the top portion diameter to form a tapered tubular upper member, the top portion diameter of sufficient size to receive a beverage container;
- b. a cylindrical lower base element having a top surface, a bottom surface and a sidewall surrounding the base element;
- c. the bottom portion of the tubular upper member mounted to the top surface of the lower base wherein the sidewall surrounding the base element is concentric to the inner and outer walls of the tubular upper member,
- d. wherein the sidewall protrudes above the top surface of the cylindrical lower base to form a circumferential channel surrounding the lower base to capture any spillage from the beverage container;
- e. Wherein the bottom surface of the lower base element has a mounted thereto a means for preventing the portable beverage container holder from sliding on a surface that it is placed thereon.

Optionally, a thermal insulator liner is provided that surrounds and adheres to the inner tubular wall. The liner is removable from the tubular upper member.

Preferably, a weight is provided within the lower base element to provide a lower center of gravity and to assist in the prevention of sliding on a surface.

In addition to the elegant design the portable beverage container holder of this invention has several advantages, in particular, it is thermally insulated, the beverage container does not touch the flat surface upon which the holder is placed, and thus the holder prevents wetting or staining of the surface, e.g., a desktop, avoiding the need for a coaster. Importantly, the holder is heavy and stable, and prevents spillage onto the desk, table or other flat surface it is placed on, and does not slide over such surface.

Other objects of the present invention will become apparent to those skilled in the art when reviewing the following detailed description.

BRIEF DESCRIPTION OF THE DRAWINGS

Further aspects, features and advantages of the present invention will become even more apparent with reference to the following detailed description and the accompanying drawings.

The drawings are not presented to scale but are only used to illustrate the principles of the invention. In the various views of the drawings, like reference characters designate like or similar parts throughout the several views.

DETAILED DESCRIPTION OF THE INVENTION

Figure 1:
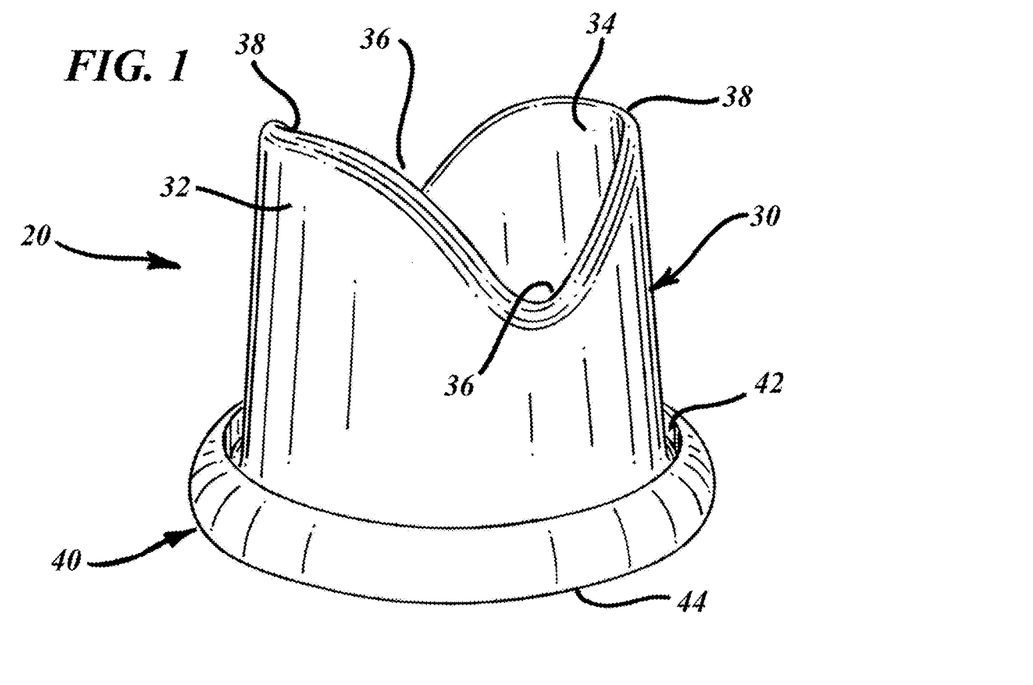
FIG. 1 is a perspective view of the portable beverage container holder of the present invention.
Figure 2:
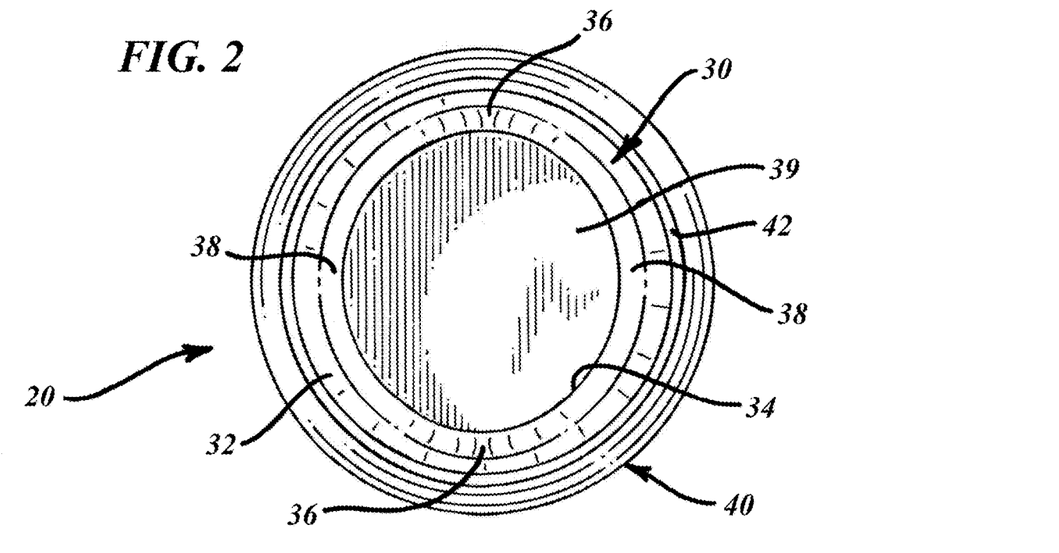
FIG. 2 is a top plan view thereof.
Figure 3:
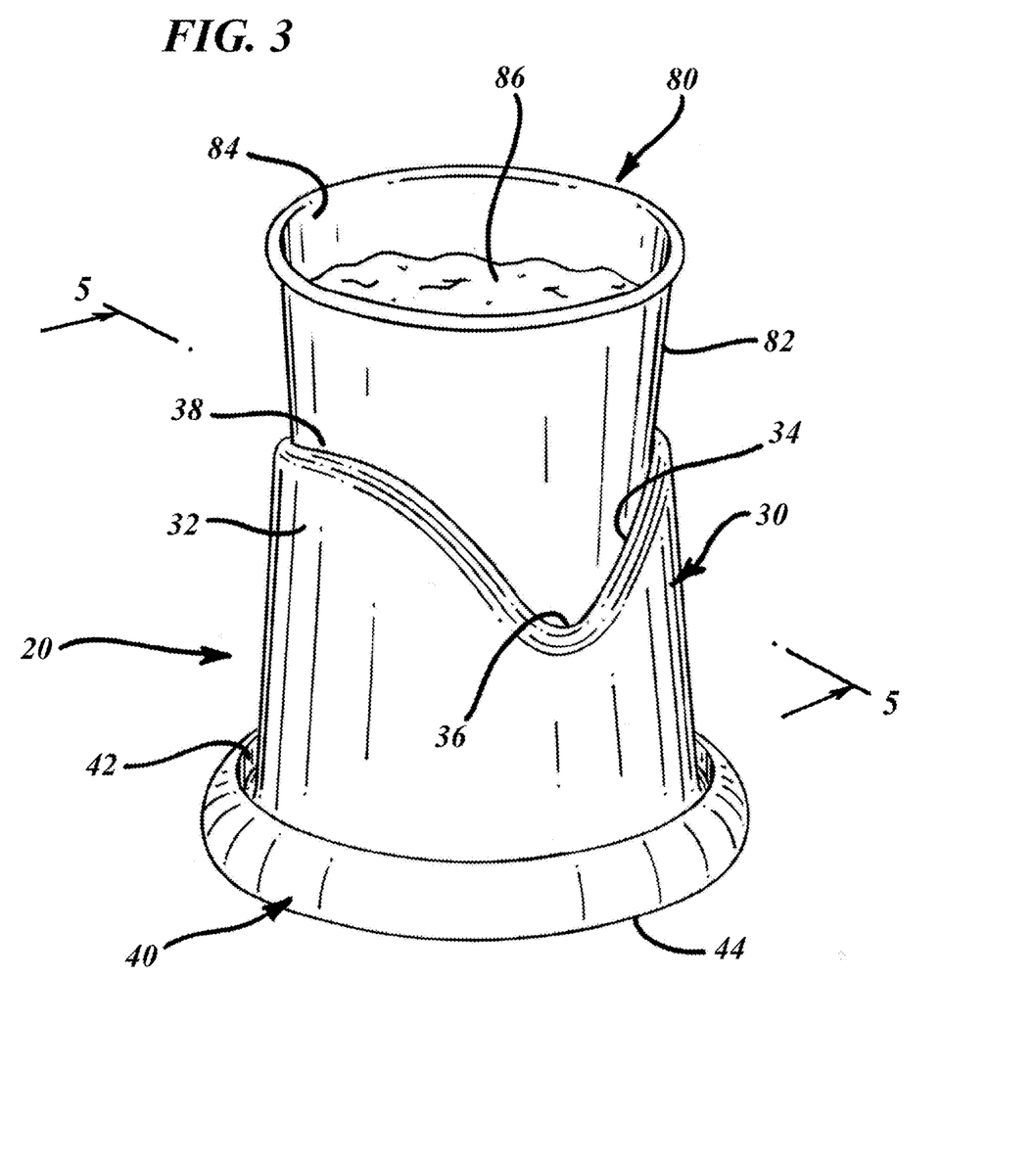
FIG. 3 is a perspective view similar to FIG. 1 wherein a beverage container is being held by the holder.

The portable beverage container holder of this invention, commonly referred to as a "cup holder," is depicted generally as 20 in FIGS. 1-13. Referring for example to FIGS. 1-3, the beverage container holder 20 is comprised of a tubular upper member 30 and a lower base element 40. The tubular upper member 30 is has an inner wall surface 34 and an outer wall surface 32 that are preferably concentric to each other. The tubular member 30 has a top portion and a bottom portion, the bottom portion having a diameter greater than the top portion diameter to form a tapered tubular upper member 30. The top portion diameter of sufficient size to receive a beverage container 80. The tubular upper member 30 has an upper surface or edge 38 connecting the surfaces 32, 34. In general, the beverage container holder 20 has a wider base footprint 40 than the tubular upper member 30. The tubular upper member 30 is tapered inwardly as it rises, and with beverage container 80 in the tubular upper member 30, a low center of gravity provides for a very stable beverage container holder 20.

Figure 4:
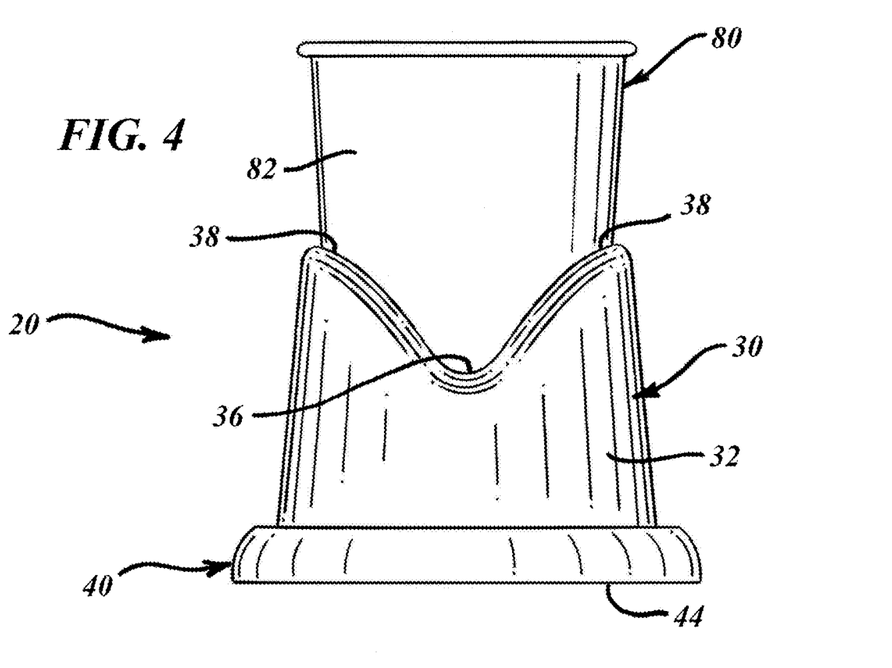
FIG. 4 is a front plan view of FIG. 3.

Referring to FIGS. 1, 3 and 4, the upper surface or edge 38 curves or slopes downward toward the lower base element 40 to form a recessed portion 36 in at least one portion of the tubular upper member 30, and preferably two portions of the tubular member 30. The bottom of the tubular upper member 30 is mounted on a base portion 40, which is preferably also cylindrical and concentric with tubular upper member 30. Preferably, as shown for example in FIG. 5, the lower base portion 40 and tubular upper member 30 are formed as one monolithic structure by molding or machining the material from which it is made. The from which the holder 20 is made is made is preferably thermal insulating to maintain the temperature of the beverage.

Figure 5:
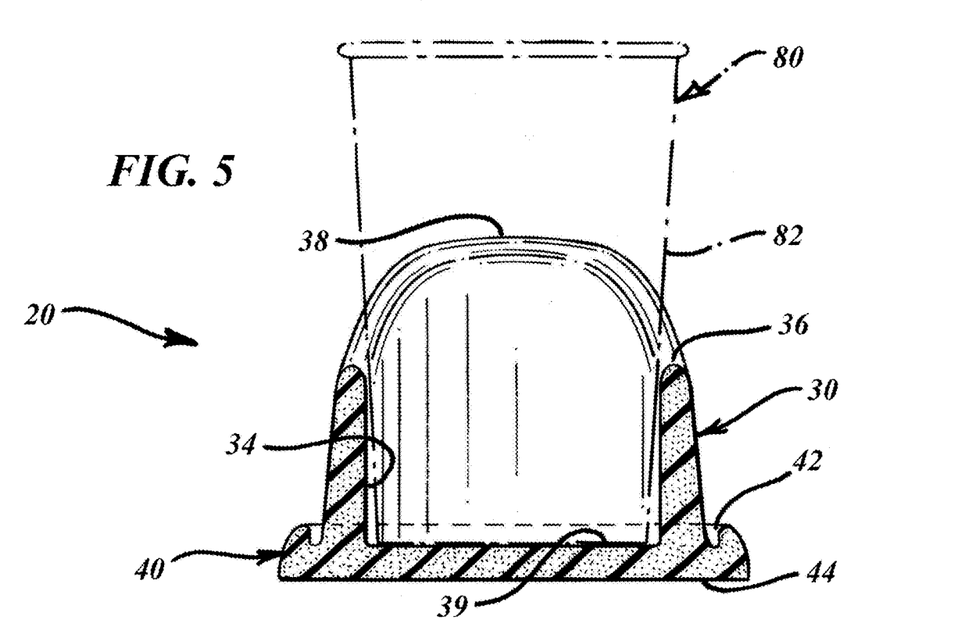
FIG. 5 is a cross-sectional view taken along section line 5-5 of FIG. 3.

Referring to FIGS. 1, 3 and 5 for example, the lower base portion 40 has a bottom surface 44 and a top surface or interior floor surface 39. The base portion 40 further includes a circumferential channel 42 that serves as a drip zone that will contain any liquids that may splash or flow down the outer wall surface 32 caused by spillage from the beverage container 80. More particularly, the cylindrical lower base element 40 has a sidewall surrounding the base element 40 that protrudes above the top surface 39 of the cylindrical lower base 40 to form a circumferential channel 42 surrounding the lower base 40 to capture any spillage from the beverage container.

Referring to FIGS. 3 and 4, in use a drinking or beverage cup 80 is placed inside of the tubular upper member 30 of the beverage container holder 20. The drinking or beverage cup 80 has a cup outer wall surface 82 and a cup inner wall surface 84 and contains the beverage 86. As shown for example in FIGS. 1 and 5, there are at least one and preferably two recessed portions 36 diametrically opposed to each other around the circumference of the tubular upper member 30. These recessed portions 36 that slope downward from upper surface or edge 38 allow the user to easily grasp the cup 80 for removal from the tubular upper member 30 or insertion therein. Preferably, the tubular upper member 30 and recessed portions 36 are designed to permit a beverage container 80 that is a coffee cup, or the like to be inserted therein 36 to permit the user to easily grasp the cup 80 for removal from the tubular upper member 30 or insertion therein. The beverage container holder 20 can be used with a number of different beverage containers 80 including paper, plastic and wax cups; glass drinking glasses, glass bottles, aluminum beverage cans, plastic and aluminum beverage bottles and the like. The beverage container holder 20 is elegantly designed and can be used in a number of different environments including office and board room settings, classrooms, studios, workstations, dorm rooms, household use, as well as restaurant and bar settings. In addition, it is easily customizable and can be branded with company logos for integration into the advertising and promotional industry.

Figure 6:
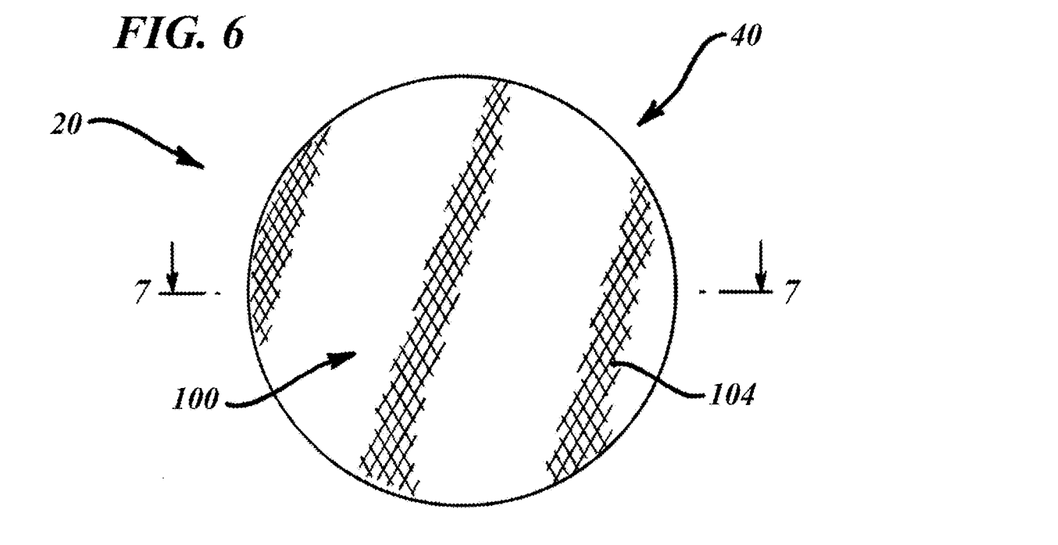
FIG. 6 is a bottom plan view of an embodiment of the beverage container holder of this invention that utilizes a non-skid laminate on the bottom thereof.
Figure 7:
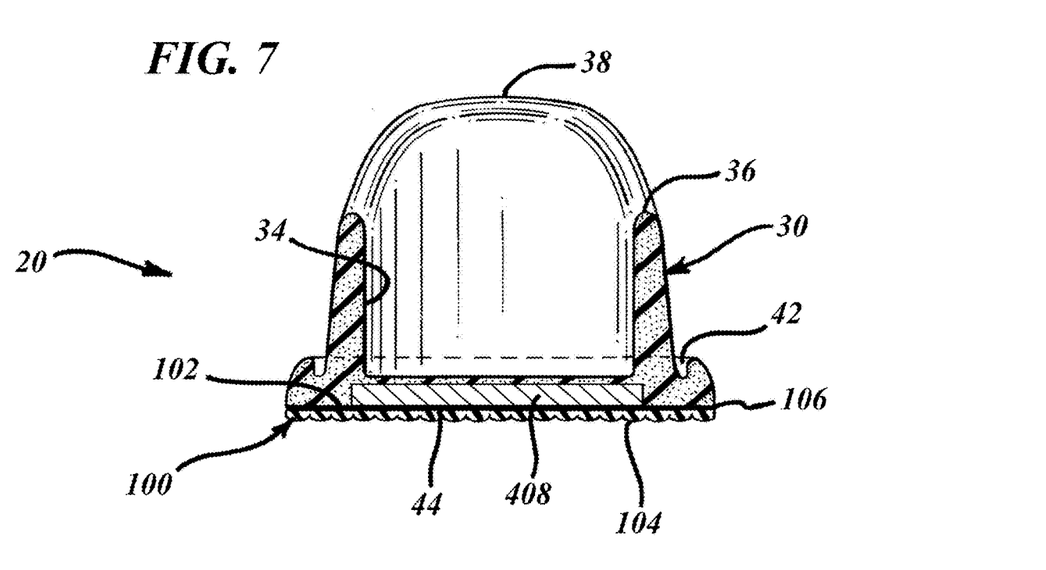
FIG. 7 is a cross-sectional view of the beverage container holder of this invention taken along section line 7-7 of FIG. 6.

FIGS. 6 and 7 depict an embodiment utilizing a non-skid material 100, e.g., rubber, foamed polymer, etc. that can be adhered to the bottom surface 44 of the lower base element 40. As shown, the non-skid material 100 has a top surface 102, a bottom surface 104 and is affixed, bonded or mounted at surface 106 utilizing, for example, by an adhesive, ultrasonically welding or formed as a part of the base 40.

Figure 9:
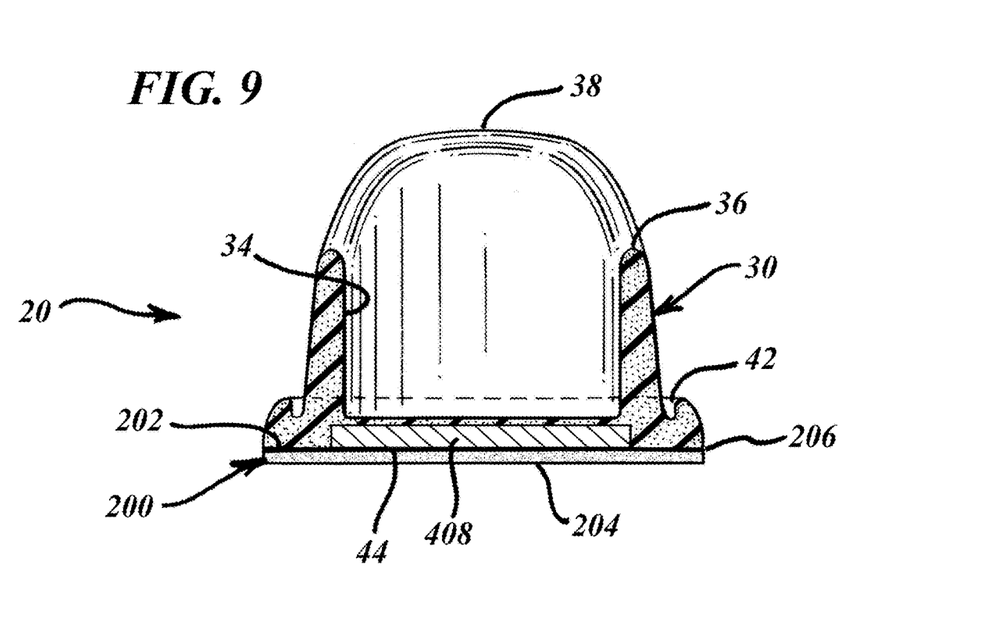
FIG. 9 is a cross-sectional view of the beverage container holder of this invention taken along section line 9-9 of FIG. 8.
Figure 11:
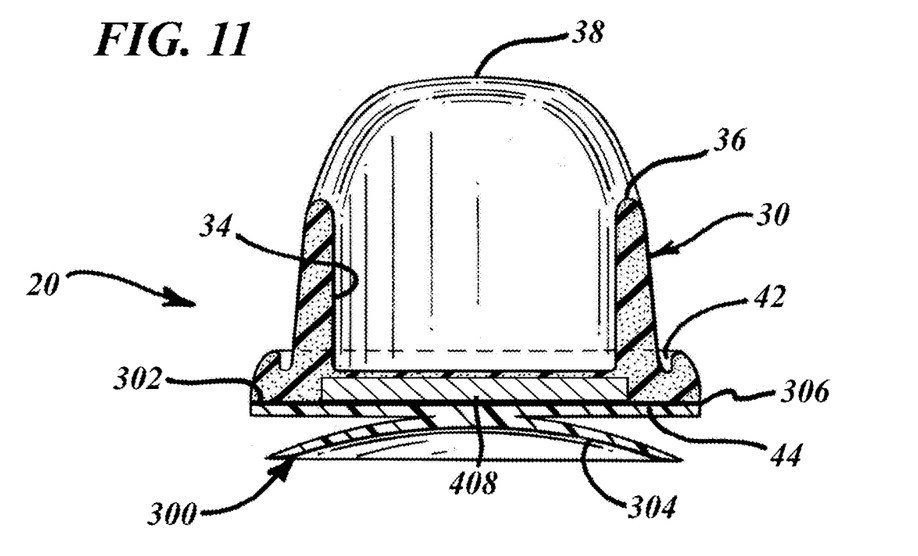
FIG. 11 is a cross-sectional view taken along section line 11-11 of FIG. 10.

As depicted in FIGS. 7, 9 and 11, an additional preferred embodiment has a weighted base 408 to help minimize movement of the beverage container holder 20. The weight 408 is preferably placed into the bottom of base 40 and is secured therein and/or covered by, for example, the non-skid material 100 (FIG. 7), the magnetic base element 200 (FIG. 200) or a suction cup 300 (FIG. 11). Weighted element 408 can be comprised of various materials such as cast-iron, steel, lead weights, stone, and the like.

Figure 8:
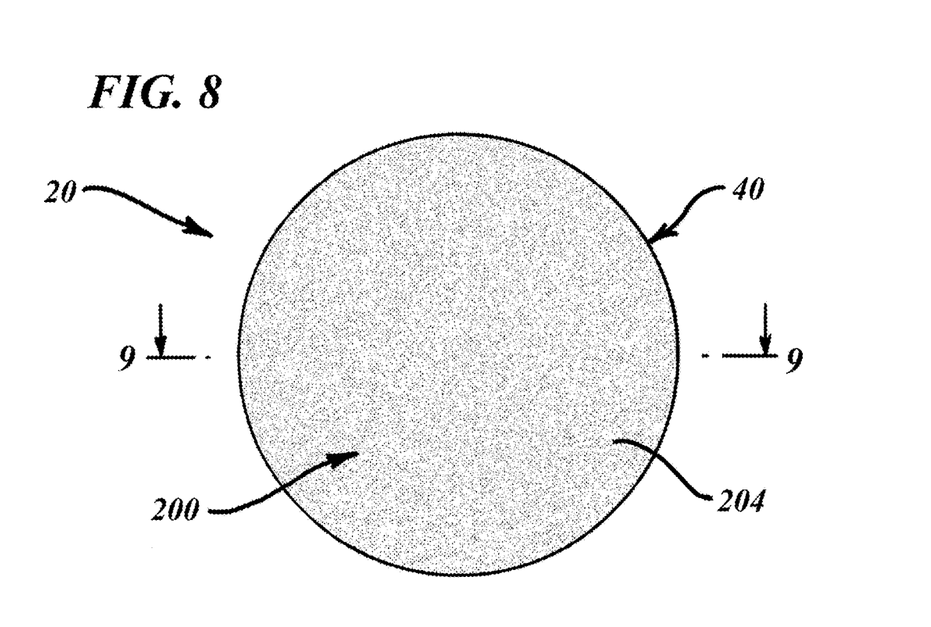
FIG. 8 is a bottom plan view of an embodiment of the beverage container holder of this invention that utilizes a magnetic laminate.

FIGS. 8 and 9 depict an embodiment utilizing a magnetic base element 200 attached to lower base element 40. The magnetic base element 200 has an upper surface 202 and a lower surface 204 and is affixed, bonded or mounted to the lower base element 40 using, for example, an adhesive 206 or screws (not shown).

Figure 10:
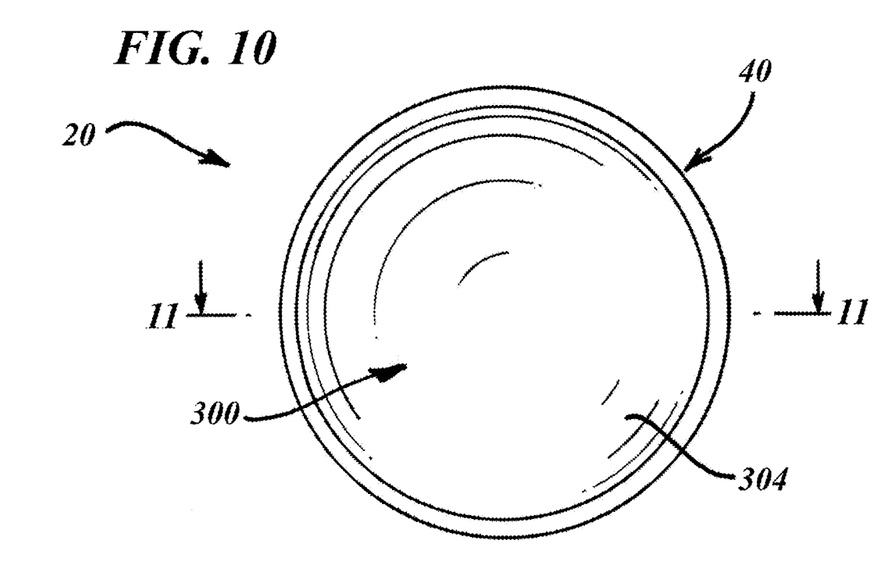
FIG. 10 is a bottom plan view of an embodiment the beverage container holder of this invention that utilizes a suction cup.

FIGS. 10 and 11 depict a suction cup 300 for securing the beverage container holder 20 to a surface. Suction cup 300 has an upper surface 302 and a lower hemispherical region 304 and is attached by way of adhesive or ultrasonic welding at surface 306.

The beverage container holder 20, including the tubular upper member 30 and lower base element 40 can be made of a number of different materials including plastics, foam rubber, polystyrene, metals, wood.

Figure 12:
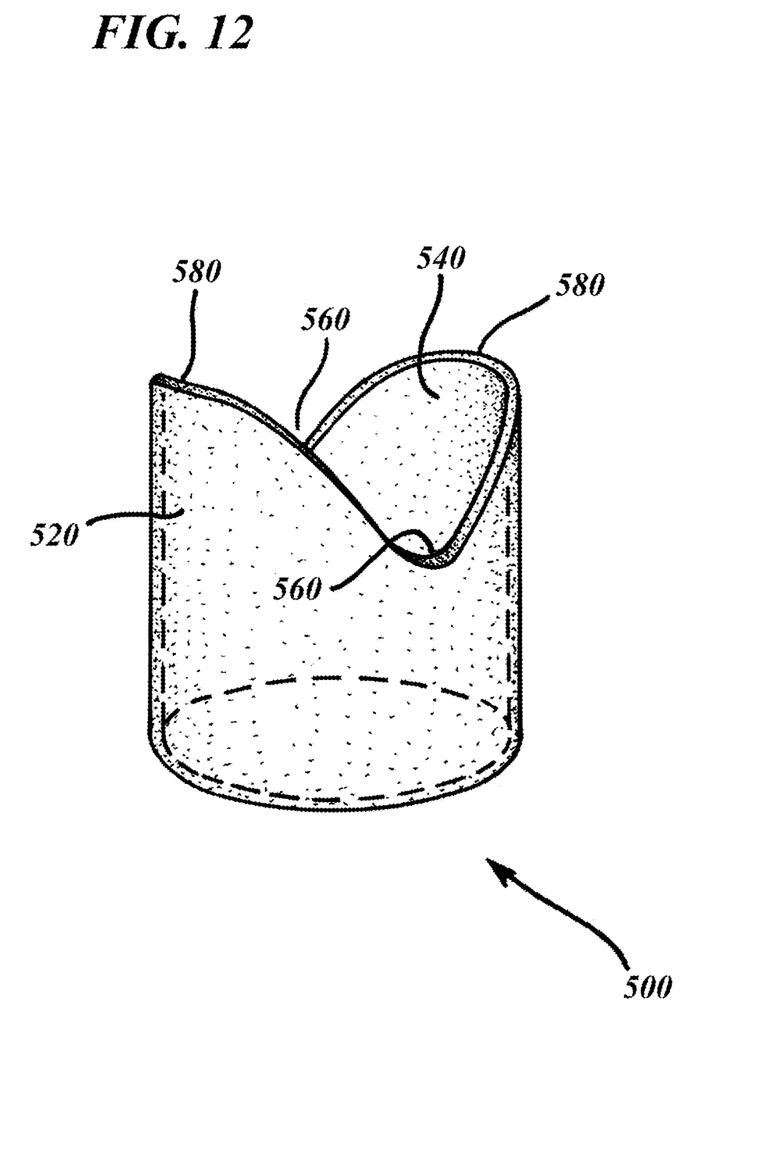
FIG. 12 is a perspective view of a removable insulating layer that can be inserted into the holder to maintain the temperature of the beverage of the container placed in the holder.

Referring to FIG. 12, an inner insulating liner 500 is shown. Insulating liner 500 may be attached to the inner wall surface 34 during fabrication using an adhesive or by way of co-extruding a combination of materials during the manufacture of the beverage container holder 20 or may be removable therefrom. Inner insulating liner 500 has an outer surface 520 and an inner surface 540 along with an upper surface or edge 580 that curves or slopes downward to form a recessed portion 560 in at least one portion of the insulating liner 500, and preferably two portions of the insulating liner 500 to overlap with the recessed portion (s) 36 in the tubular member 30.

As a further embodiment, the beverage container holder 20, in particular the tubular upper member 30 and lower base element 40, can be fabricated of a hot or cold insulating material, such as insulating synthetic material, rubber, or other thermally insulating material, for further maintaining a temperature of a beverage in the container, similar to the thermal material used in the insulating liner 500 described above that will help keep the beverage cold or warm depending on the usage.

Figure 13:
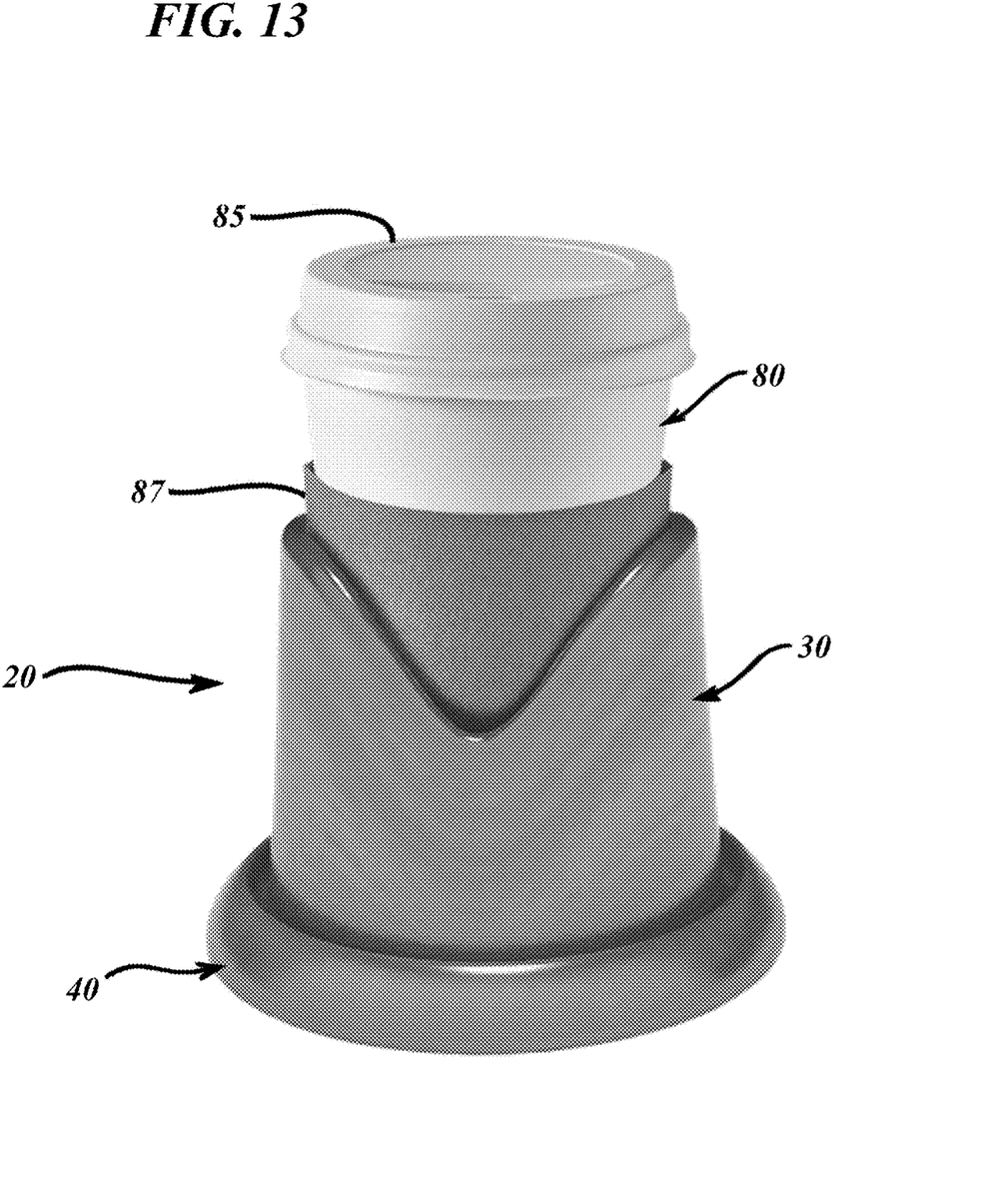
FIG. 13 is a three dimensional digital image of the beverage container holder of this invention.

FIG. 13 is an environmental view wherein beverage cup 80 is placed within beverage container holder 20. As can be seen beverage cup 80 has cap 85 and a paperboard sleeve 87 which is commonly provided by coffee shops and the like.

The aforedescribed holder 20 has numerous benefits, aside from the elegant design, in particular, it is thermally insulated, the beverage container does not touch the flat surface upon which the holder is placed, and thus the holder prevents wetting or staining of the surface, e.g., a desktop, avoiding the need for a coaster. Importantly, the holder is heavy and stable, and prevents spillage onto the desk, table or other flat surface it is placed on, and does not slide over such surface.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

What is claimed is:

1. A portable beverage container holder for a beverage container comprising:
   a. a tubular upper member having an inner wall and an outer wall that are concentric to each other;
   b. a thermal insulator liner that surrounds and adheres to the inner wall, wherein the diameter of the inner wall with the thermal insulator liner adhered thereto permits the free insertion and withdrawal of the beverage container therefrom;
   c. a cylindrical lower base element having a top surface, a bottom surface and a sidewall surrounding the base element, wherein the bottom portion of the tubular upper member is mounted to the top surface of the lower base element, wherein the sidewall surrounding the base element is concentric to the inner and outer walls of the tubular upper member, the sidewall protrudes above the top surface of the cylindrical lower base element to form a circumferential channel surrounding the tubular upper member to capture any spillage from the beverage container, the beverage container resting on the top surface of the lower base element when inserted into the tubular upper member, wherein the tubular upper member and cylindrical lower base element are molded together as one monolithic structure from a thermal insulating material;

d. a weight mounted to the bottom surface of the lower base element to prevent the container holder from being lifted from the surface when the beverage container is removed therefrom;

e. a non-skid polymeric laminate adhered to at least a portion of the bottom surface of the lower base element to prevent the portable beverage container holder from sliding on a surface that it is placed on;

f. two recessed portions sloping downward toward the lower base element formed in the top portion of the tubular upper member at two diametrically opposed locations to allow the user to easily grasp the beverage container therein for removal from or insertion into the tubular upper member.

\* \* \* \* \*